Feb. 15, 1955    D. C. REDICK    2,702,327
DIRECTION SIGNAL SWITCH MECHANISM
Filed June 18, 1952    2 Sheets-Sheet 1
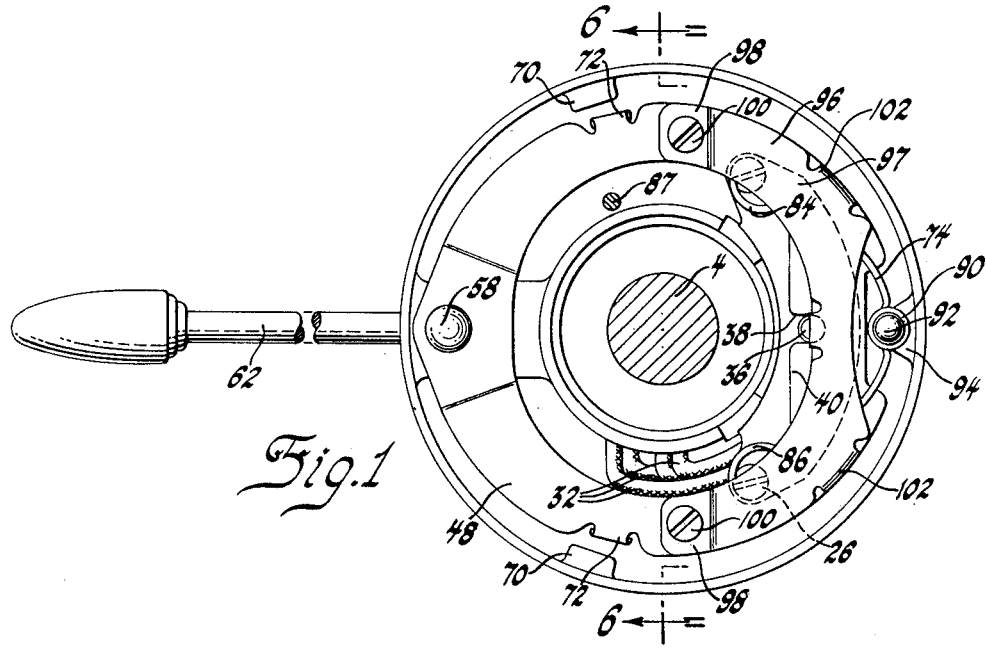
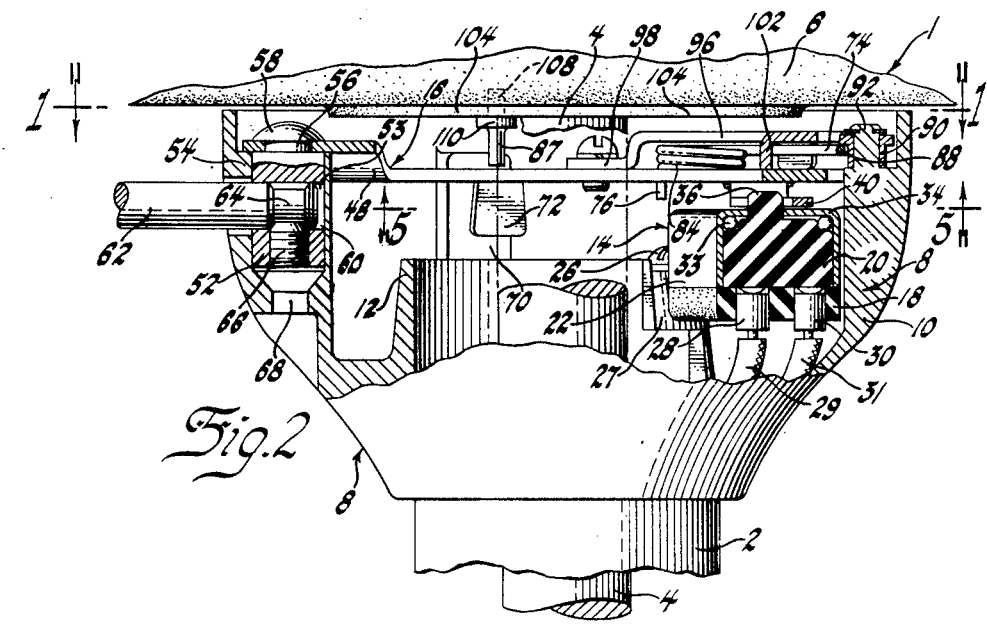
Inventor
David C. Redick
By
Willits, Helmig & Baillio
Attorneys Feb. 15, 1955   D. C. REDICK   2,702,327
DIRECTION SIGNAL SWITCH MECHANISM
Filed June 18, 1952   2 Sheets-Sheet 2
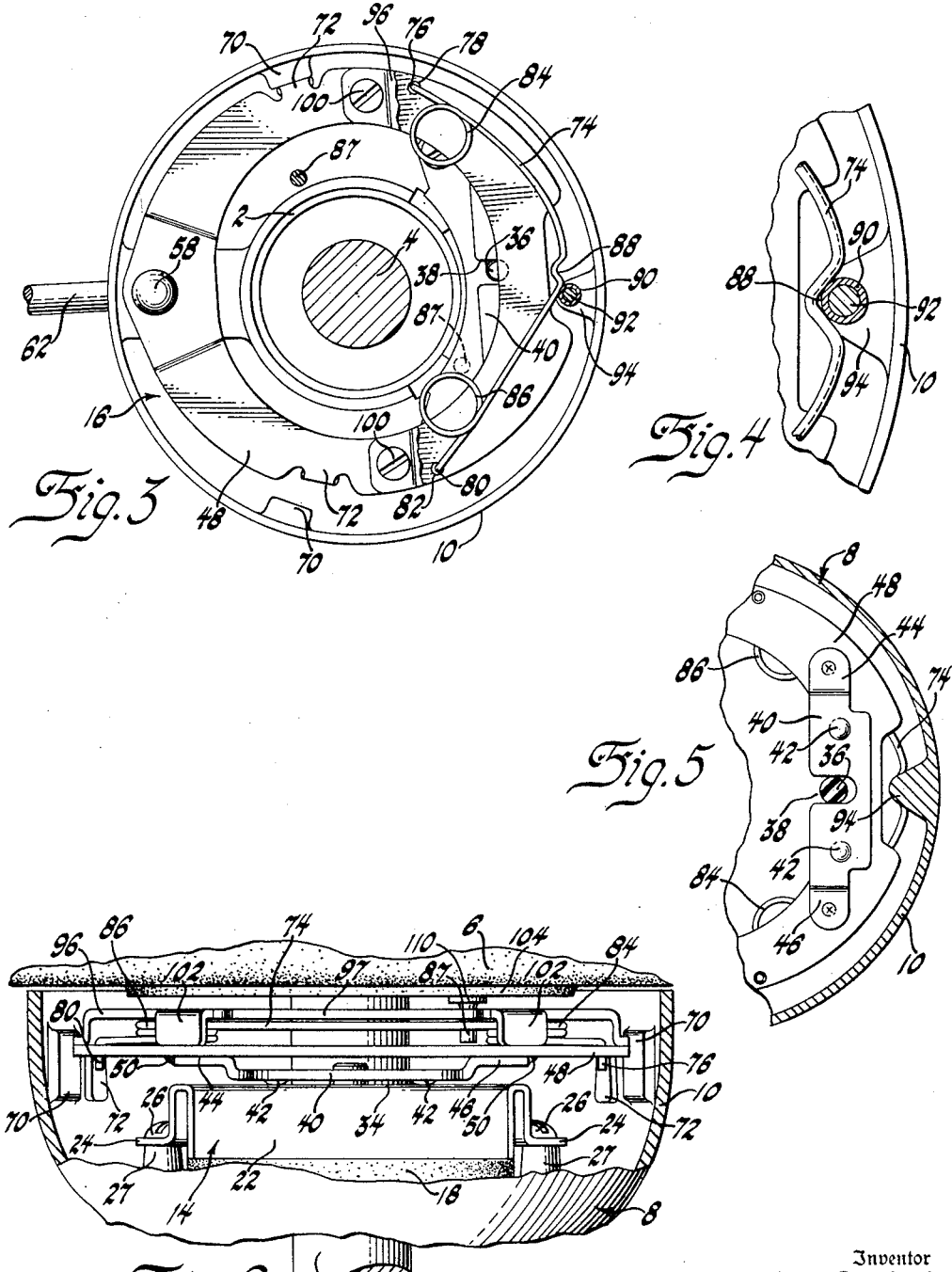
Inventor
David C. Redick
By Willits, Helmig & Baillio
Attorneys United States Patent Office 2,702,327
Patented Feb. 15, 1955

2,702,327

DIRECTION SIGNAL SWITCH MECHANISM

David C. Redick, Anderson, Ind., assignor to General Motors Corporation, Detroit, Mich., a corporation of Delaware Application June 18, 1952, Serial No. 294,221

19 Claims. (Cl. 200—61.34)

This invention relates to switch operating mechanisms and more particularly to operating mechanism for direction signal switches employed on motor vehicles.

Direction signals serve important functions both from the standpoint of safety and also as aids in relieving traffic congestion. In most cases the operating mechanisms for signal switches employed heretofore have either been of relatively complicated design or if of simplified construction either lacked certain safety features or were generally incapable of efficient and satisfactory operation.

One object of the present invention is to provide a simplified and highly improved operating mechanism for switches which is capable of long and efficient use and which requires a minimum of attention or repair.

Another object is to provide a novel means for returning the switch operating mechanism to normal position by rotation of the vehicle steering wheel in a direction to straighten the vehicle after effecting a turn in either direction.

A further object is to provide in signal switch operating mechanisms of the character described, means operable by the steering shaft or the steering wheel to return the mechanism to a neutral or normal position after operation thereof to a signalling position in either direction, which is so constructed as to prevent binding of the steering shaft.

A more specific object is to provide in a direction switch operating mechanism of the class described, resilient dog members adapted for engagement by dog ears carried by the steering wheel to return the switch mechanism to a neutral position after manual adjustment thereof to a switch closing position in either direction from said neutral position, the said resilient dog means preventing binding of the steering shaft or damage to the parts during abnormal operation of the said mechanism.

A still further object is to provide in a direction signal switch mechanism of the stated character a pair of spaced dogs and detent means constructed of a single wire spring.

A still further object is to provide a direction signal switch operating mechanism which is simple in construction, economic in manufacture, and highly efficient in operation.

Other and further objects will become apparent as the description of the invention progresses.

Of the drawings:

Fig. 1 is a plan view of the switch operating mechanism taken substantially along line 1—1 of Fig. 2, certain parts thereof being shown in section.

Fig. 2 is an elevational view, partly in section and with parts broken away, showing the structure of the various elements of the direction signal switch and operating mechanism therefor.

Fig. 3 is a plan view, partly in section, generally similar to Fig. 1 showing the position of the parts when the switch operating mechanism is moved to one position of adjustment.

Fig. 4 is an enlarged fragmentary view showing the means associated with the switch operating mechanism for holding the parts in different positions of adjustment.

Fig. 5 is an enlarged fragmentary view, partly in section, showing certain elements of the switch operating mechanism, said view being taken substantially along line 5—5 of Fig. 2, and Fig. 6 is an elevational view, partly in section, taken substantially along line 6—6 of Fig. 1.

Referring to the drawings, the numeral 1 indicates generally the steering mechanism of a motor vehicle which consists of a stationary steering column 2 secured in the usual fashion to the framework of a motor vehicle. Mounted within steering column 2 and disposed in substantially concentric relation therewith is a steering shaft 4 having a steering wheel 6 secured to the upper end thereof. Secured in any suitable manner on column 2 near the upper end thereof and disposed immediately beneath steering wheel 6 is a cup-shaped casing 8. Casing 8 may be constructed of any suitable material, as for example, die-cast aluminum, and comprises an outer annular wall portion 10 and an inner annular upwardly projecting flange portion 12. The casing 8 houses the direction signal switch indicated generally at 14 and the operating mechanism therefor indicated generally at 16. Switch 14 may be of any suitable construction and comprises an insulated stationary contact member 18 and a movable bridging contact member 20. The contact members 18 and 20 of switch 14 are supported and partially enclosed within bracket 22 having outwardly extending flanges 24 at the opposite ends thereof which are secured by machine screws 26 to the posts 27 secured to and extending upwardly from housing 8. Stationary contact member 18 has secured thereto terminals 28 and 30, the former of which may be connected to any suitable source of power such as the battery of the vehicle by a conductor 29 and the latter to ground by a conductor 31. The other contacts of stationary switch 14 may be connected to front and rear direction signal lamps and to tell-tale signal lamps by conductors 32 shown generally in Fig. 1. Anti-friction balls 33 are provided between the upper end of switch element 20 and the underside of the upper wall 34 of bracket 22 to facilitate sliding movement of said contact element during operation of the device. Switch 14 and the signal system generally may be of any suitable construction and for a complete disclosure of one form thereof, reference may be had to the co-pending application of John W. Lawson et al., Serial No. 40,196, filed July 22, 1948.

In operation when the movable switch contact member 20 is shifted to one position from its neutral position shown in Fig. 1, it closes the circuit to the left-hand signal lamps provided at the front and rear of the vehicle and also to a tell-tale signal usually mounted on the instrument panel of the vehicle. When the movable contact member 20 is shifted in the opposite direction the right front and rear signal lamps are energized as well as the tell-tale signal lamp provided on the instrument panel and when the switch element is in a central or neutral position the circuits to all of the direction and tell-tale signal lamps will be interrupted.

Movable contact member 20 has provided thereon a vertically extending projection or arm 36 which extends into a slot 38 provided intermediate the ends of an operating bar 40. Operating bar 40 is substantially U-shaped, as shown more particularly in Fig. 6, and is provided with spaced bearing lugs 42 which engage the upper surface of the top wall 34 of switch casing 22. The opposite ends 44 and 46 of bar 40 are secured to the under surface of an annular switch operating ring member 48 by welding as shown at 50 or by any other suitable means. Ring member 48 is normally disposed in substantially concentric relation with steering shaft 4 and the left-hand end thereof is secured to the upper end of a pivot post 52 pivotally mounted in a bore 53 provided in the enlarged portion 54 provided at one side of the wall 10 of casing 8. Post 52 is provided with a reduced portion 56 near the upper end thereof which extends through an opening in the annular switch operating ring member 48 and the upper end thereof is peened thereover, as shown at 58, to secure said member to said post. Post 52 is provided with a transverse opening 60 intermediate its ends for receiving the inner end of a switch operating lever 62. Lever 62 is provided with a reduced annular portion 64 near the inner end thereof for receiving a locking screw 66. Locking screw 66 may be rotated by inserting a tool through an opening 68 provided in wall 10 of the casing immediately beneath bore 53. It therefore is seen that upon movement of lever 62 in a counterclockwise direction, the switch operating ring member 48 will be swung upwardly (Fig. 1) and when lever 62 is moved in a clockwise direction ring 48 will be actuated downwardly. To limit the swinging movement of annular operating member 48, stops 70 are provided at the opposite sides of casing 8 which engage struck-down projections or ears 72 provided at the opposite sides of said operating member. Mounted on ring 48 at the portion thereof disposed opposite to pivot post 52 is spring wire 74. Spring 74 is bent downwardly at one end, as shown at 76, and extends into an aperture 78 provided in ring member 48. The opposite end of spring 74 is likewise bent downwardly, as shown at 80, and extends into an aperture 82 provided in the opposite side of operating member 48. Spring 74 is provided with loops 84 and 86 near the opposite ends thereof, which, as will appear later herein, constitute dogs which cooperate with a dog pin 87 carried by the steering wheel to return the switch operating member 48 to neutral position after operation thereof to a signal indicating position in either direction. Spring 74 is also bent to form a detent indexing notch or recess 88 intermediate its ends which is adapted to engage a roller or bushing 90 mounted on a cylindrical projection 92 integral with and extending upwardly from the enlarged portion 94 of the wall 10 of casing 8. It is apparent that when detent recess 88 engages roller 90 the operating ring 48 will be retained in a normal or neutral position of adjustment. When lever 62 is moved to the position shown in Fig. 3, spring 74 will move inwardly to permit the high portion on one side of the notch 88 to clear roller 90, the spring 74 then bearing against roller 90 to effectively hold member 48 in that position of adjustment. When lever 62 is swung in the opposite direction, the portion of spring on the opposite side of recess 88 will engage roller 90 to again hold the member 48 and associated parts in adjusted position.

An arcuate retainer plate 96 overlies the major portion of spring 74 including the loops 84 and 86 and thereby retains the spring in operative position. Plate 96 is provided with a raised portion 97 and securing feet 98 at the ends thereof, which are secured to the operating ring member 48 by machine screws 100. The outer and inner edges of plate 96 have struck-down ears 102 provided thereon which, as shown more particularly in Fig. 6, engage the upper surface of operating ring member 48 and thereby prevent movement of the latter out of proper position.

The hub 104 of steering wheel 6 has secured to and depending therefrom the pin 87 which is adapted to engage dog coil 84 or 86 when either one has been moved out of its neutral position, shown in Fig. 1, to return the switch operating mechanism to neutral position. Pin 87 is provided with a portion 108 which may be press fitted into the hub 104 of steering wheel 1 until the intermediate flange 110 thereon engages said hub.

From the foregoing description it is seen that when the parts are in the position shown in Fig. 1, the circuits to the front and rear signalling lamps are interrupted. To effect a left turn signal, lever 62 is swung in a counterclockwise direction, as viewed in Fig. 1, thereby bringing dog 86 into the orbital path of pin 87. So long as steering wheel 6 and steering shaft 4 are rotated in a counterclockwise direction to effect a left turn of the vehicle, the pin 87 striking dog 86 will simply resiliently urge the latter outwardly until the said pin clears it. However, when the steering wheel is turned in a clockwise direction to straighten the vehicle after the turn has been effected, pin 87 striking dog 86 will cause the annular operating member 48 to move downwardly (Fig. 1) against the action of spring 74 toward normal or neutral position. As soon as the high point of spring 74 clears roller 92 the outward action of the spring will also tend to effect proper positioning of the parts until they assume the normal or neutral position shown in Fig. 1. In order to indicate a right turn signal, the lever 62 is swung in a clockwise direction, or upwardly, as viewed in Fig. 1, thereby bringing dog coil 84 into the orbital path of pin 87. As long as the steering wheel is turned in a clockwise direction to effect a right turn operation of the vehicle, the pin 87 will simply move dog coil 84 outwardly without imparting any movement to switch operating ring member 48. However, when the steering wheel is turned in the opposite direction to straighten the vehicle after making the right turn, pin 87 striking dog coil 84 will swing member 48 to neutral position. It is seen that dogs 84 and 86 are of resilient construction. Consequently, should any foreign matter such as a loose nut or bolt become lodged against any of the parts, due to the resilient construction of the dog coils 84 and 86 and spring 74, no binding action will take place and consequently the steering shaft may always be freely operated. It is also seen that should the operating lever 62 for any reason be held against movement while the steering wheel is turned to straighten the vehicle after a turn has been effected, pin 87 will simply move the dog coil 84 or 86 outwardly until it clears the latter. Owing to the flexible construction of the dogs 84 and 86, binding of the steering shaft is not only prevented thereby insuring safe operation, but damage to the operating parts of the switch operating mechanism is also prevented in case of any abnormal operation thereof. Only one cancelling pin or dog pin 87 has been shown herein, it being apparent that more than one such pin may be provided if desired without departing from the invention.

From the foregoing description it is seen that a simplified and highly efficient direction signal switch mechanism has been provided. By providing a switch operating mechanism having resilient parts, safe operation is assured and damage to the parts is prevented.

While but a single embodiment of the invention has been shown and described herein, it will be apparent that other and further embodiments may be made without departing from the invention. It therefore is to be understood that it is not intended to limit the invention to the single embodiment disclosed but only by the scope of the claims which follow.

What is claimed is:

1. A direction signal switch mechanism, comprising, a switch, an operating member operatively connected to said switch and adapted for movement from a central position to switch closing positions at either side of said central position, and means for returning said switch and operating member to said central position after operation thereof to either of said switch closing positions, said last mentioned means comprising dog actuating means and adapted for rotation in an orbital path, and a pair of spaced resilient coil dogs carried by said operating member, one of said dogs being positioned in the orbital path of said dog actuating means when said operating member is moved in one direction from said central position, and the other of said dogs being positioned in the orbital path of said dog actuating means when said operating member is moved in the opposite direction from said central position.

2. A direction signal switch mechanism, comprising, a switch, an operating member operatively connected to said switch and adapted for movement from a central position to switch closing positions at either side of said central position, and means for returning said switch and operating member to said central position after operation thereof to either of said switch closing positions, said last mentioned means comprising dog actuating means and adapted for rotation in an orbital path carried by said operating member, said member having spaced coil dogs formed thereon one of said dogs being positioned in the orbital path of said dog actuating means when said operating member is moved in one direction from said central position, and the other of said dogs being positioned in the orbital path of said dog actuating means when said operating member is moved in the opposite direction from said central position, and resilient detent means for holding said operating member and switch in said different positions of adjustment.

3. A direction signal switch mechanism, comprising, a switch, an operating member operatively connected to said switch and adapted for movement from a central position to switch closing positions at either side of said central position, and means for returning said switch and operating member to said central position after operation thereof to either of said switch closing positions, said last mentioned means comprising dog actuating means and adapted for rotation in an orbital path, a spring member secured to said operating member, and coil dog means formed at spaced points on said spring member and adapted for movement into the orbital path of said dog actuating means.

4. A direction signal switch mechanism, comprising, a switch, an operating member operatively connected to said switch and adapted for movement from a central position to switch closing positions at either side of said central position and means for returning said switch and operating member to said central position after operation thereof to either of said switch closing positions, said last mentioned means comprising dog actuating means and adapted for rotation in an orbital path, a spring member extending across said operating member and having its opposite ends pivotally secured thereto, dog means formed at intermediate spaced points on said spring member and adapted for movement into the orbital path of said dog actuating means, movable detent means formed on said spring member, and stationary means engaging said movable detent means to hold said operating member and switch in adjusted position.

5. A direction signal switch mechanism, comprising, a switch, an operating member operatively connected to said switch and adapted for movement from a central position to switch closing positions at either side of said central position, and means for returning said switch and operating member to said central position after operation thereof to either of said switch closing positions, said last mentioned means comprising dog actuating means and adapted for rotation in an orbital path, a wire spring secured at its opposite ends to said operating member at opposite sides of the latter, and coil dog means formed at spaced points on said spring and adapted for movement into the orbital path of said dog actuating means.

6. A direction signal switch mechanism, comprising, a switch, an operating member operatively connected to said switch and adapted for movement from a central position to switch closing positions at either side of said central position, and means for returning said switch and operating member to said central position after operation thereof to either of said switch closing positions, said last mentioned means comprising dog actuating means and adapted for rotation in an orbital path, a wire spring secured at its opposite ends to said operating member at opposite sides of the latter, coil dog means formed at spaced points on said spring and adapted for movement into the orbital path of said dog actuating means, movable indexing means formed on said wire spring, and stationary means cooperating with said movable indexing means for retaining said operating member and switch in adjusted position.

7. A direction signal switch mechanism, comprising, a switch, an operating member operatively connected to said switch and adapted for movement from a central position to switch closing positions at either side of said central position, and means for returning said switch and operating member to said central position after operation thereof to either of said switch closing positions, said last mentioned means comprising dog actuating means and adapted for rotation in an orbital path, a wire spring secured at its opposite ends to said operating member at opposite sides of the latter, coil dog means formed at spaced points on said spring and adapted for movement into the orbital path of said dog actuating means, movable indexing means formed on said wire spring, stationary means cooperating with said movable indexing means for retaining said operating member and switch in adjusted position, and means for retaining said wire spring in position on said operating member.

8. A direction signal switch mechanism, comprising, a steering shaft, a steering column surrounding said shaft, supporting means mounted on said column, a switch having fixed and movable contacts mounted on said supporting means, a switch operating ring surrounding said shaft and adapted for movement from a central position to switch closing positions at either side of said central position, means operatively connecting said movable contact to said operating ring, means for pivotally supporting said ring at one side thereof on said supporting means, and means for returning said switch operating ring to said central position after actuation thereof to switch closing position at either side of said central position, said last mentioned means comprising dog actuating means movable with said steering shaft in an orbital path, and spaced spring dogs pivotally supported on said ring and adapted for movement into the orbital path of said dog means.

9. A direction signal switch mechanism, comprising, a steering shaft, a steering column surrounding said shaft, supporting means mounted on said column, a switch having fixed and movable contacts mounted on said supporting means, a switch operating ring surrounding said shaft and adapted for movement from a central position to switch closing position at either side of said central position, means operatively connecting said movable contact to said operating ring, means for pivotally supporting said ring at one side thereof on said supporting means, and means for returning said switch operating ring to said central position after actuation thereof to switch closing position at either side of said central position, said last mentioned means comprising dog actuating means movable with said steering shaft in an orbital path, a wire spring secured to said switch operating ring, and coil dog means formed on said wire spring at spaced points thereon, one of said dogs being adapted upon movement of said ring to switch closing positions to be positioned in the orbital path of said dog actuating means.

10. A direction signal switch mechanism, comprising, a steering shaft, a steering column surrounding said shaft, supporting means mounted on said column, a switch having fixed and movable contacts mounted on said supporting means, a switch operating ring surrounding said shaft and adapted for movement from a central position to switch closing position at either side of said central position, means operatively connecting said movable contact to said operating ring, means for pivotally supporting said ring at one side thereof on said supporting means, and means for returning said switch operating ring to said central position after actuation thereof to switch closing position at either side of said central position, said last mentioned means comprising dog actuating means movable with said steering shaft in an orbital path, a wire spring secured to said switch operating ring, coil dog means formed on said wire spring at spaced points thereon, one of said dogs being adapted upon movement of said ring to switch closing positions to be positioned in the orbital path of said dog actuating means, indexing means formed on said wire spring and movable with said switch operating ring, and stationary means on said supporting means cooperating with said indexing means to retain said ring in different adjusted positions.

11. In an automotive vehicle having a steering column, a steering shaft mounted within said column and a steering wheel secured to one end of said shaft, the combination of a direction signal switch mechanism comprising a supporting casing, a switch mounted in said casing having fixed and movable contacts, a switch operating ring surrounding said shaft, means for pivotally supporting said ring at one side thereof in said casing, said ring being movable from a central position to switch closing positions at either side of said central position, means for connecting said movable contact to said ring, and means for returning said ring to said central position after operating thereof to either of said switch closing positions, said last mentioned means comprising dog actuating means carried by said steering wheel and movable in an orbital path, a wire spring secured at the opposite ends thereof to said ring, and spaced dog coils formed on said wire spring, one of said dog coils being movable into the orbital path of said dog actuating means when said ring is moved to one of said switch closing positions and the other of said coil dogs being movable into the orbital path of said dog actuating means when said ring is moved to another of said switch closing positions.

12. In an automotive vehicle having a steering column, a steering shaft mounted within said column and a steering wheel secured to one end of said shaft, the combination of a direction signal switch mechanism comprising a supporting casing, a switch mounted in said casing having fixed and movable contacts, a switch operating ring surrounding said shaft, means for pivotally supporting said ring at one side thereof in said casing, said ring being movable from a central position to switch closing positions at either side of said central position, means for connecting said movable contact to said ring, and means for returning said ring to said central position after operating thereof to either of said switch closing positions, said last mentioned means comprising dog actuating means carried by said steering wheel and movable in an orbital path, a wire spring secured at the opposite ends thereof to said ring, spaced dog coils formed on said wire spring, one of said dog coils being movable into the orbital path of said dog actuating means when said ring is moved to one of said switch closing positions and the other of said coil dogs being movable into the orbital path of said dog actuating means when said ring is moved to another of said switch closing positions, indexing means for said ring formed on said wire spring, and means on said casing cooperating with said indexing means to retain said ring in its different positions of adjustment.

13. In an automotive vehicle having a steering column, a steering shaft mounted within said column and a steering wheel secured to one end of said shaft, the combination of a direction signal switch mechanism comprising a supporting casing, a switch mounted in said casing having fixed and movable contacts, a switch operating ring surrounding said shaft, means for pivotally supporting said ring at one side thereof in said casing, said ring being movable from a central position to switch closing positions at either side of said central position, means for connecting said movable contact to said ring, and means for returning said ring to said central position after operating thereof to either of said switch closing positions, said last mentioned means comprising dog actuating means carried by said steering wheel for movement in an orbital path, a wire spring secured at the opposite ends thereof to the opposite sides of said ring, spaced dog coils formed on said wire spring, one of said dog coils being movable into the orbital path of said dog actuating means when said ring is moved to one of said switch closing positions and the other of said coil dogs being movable into the orbital path of said dog actuating means when said ring is moved to another of said switch closing positions, said wire spring and coil dogs being so constructed that when said steering wheel and shaft are turned in the direction of the indicated turn said dog actuating means moves said dog coil out of the orbital path thereof until said dog actuating means clears said dog coil when the latter springs back into the orbital path of said dog actuating means, and when said steering wheel and shaft are turned in the opposite direction to straighten the vehicle after the turn is completed said dog actuating means engaging said dog coil returns the latter and said operating ring and switch to said central position, and means for retaining said wire spring in position on said operating ring.

14. In an automotive vehicle having a steering column, a steering shaft mounted within said column and a steering wheel secured to one end of said shaft, the combination of a direction signal switch mechanism comprising a supporting casing, a switch mounted in said casing having fixed and movable contacts, a switch operating ring surrounding said shaft, means for pivotally supporting said ring at one side thereof in said casing, said ring being movable from a central position to switch closing positions at either side of said central position, means for connecting said movable contact to said ring, and means for returning said ring to said central position after operating thereof to either of said switch closing positions, said last mentioned means comprising dog actuating means carried by said steering wheel for movement in an orbital path, a wire spring secured at the opposite ends thereof to said ring, spaced dog coils formed on said wire spring, one of said dog coils being movable into the orbital path of said dog actuating means when said ring is moved to one of said switch closing positions and the other of said coil dogs being movable into the orbital path of said dog actuating means when said ring is moved to another of said switch closing positions, said wire spring and the dog coils formed thereon being so constructed that should the said operating ring be held in the switch operating position at either side of said central position the dog coil positioned in the orbital path of said dog actuating means will be urged by the latter out of the path thereof until said dog actuating means clears the said dog coil during movement of said dog actuating means in either direction, said dog coil springing back into the orbital path of said dog actuating means when latter clears said dog, thereby preventing binding of the steering shaft and damage to the operating parts in the event of any abnormal operation of said mechanism.

15. In an automotive vehicle having a steering column, a steering shaft mounted within said column and a steering wheel secured to one end of said shaft, the combination of a direction signal switch mechanism comprising a supporting casing, a switch mounted in said casing having fixed and movable contacts, a switch operating ring surrounding said shaft, means for pivotally supporting said ring at one side thereof in said casing, said ring being movable from a central position to switch closing positions at either side of said central position, means for connecting said movable contact to said ring, and means for returning said ring to said central position after operating thereof to either of said switch closing positions, said last mentioned means comprising dog actuating means carried by said steering wheel for movement in an orbital path, a wire spring secured at the opposite ends thereof to the opposite sides of said ring, spaced dog coils formed on said wire spring, one of said dog coils being movable into the orbital path of said dog actuating means when said ring is moved to one of said switch closing positions and the other of said coil dogs being movable into the orbital path of said dog actuating means when said ring is moved to another of said switch closing positions, said wire spring and coil dogs being so constructed that when said steering wheel and shaft are turned in the direction of the indicated turn said dog actuating means moves said dog coil out of the orbital path thereof until said dog actuating means clears said dog coil when the latter springs back into the orbital path of said dog actuating means, and when said steering wheel and shaft are turned in the opposite direction to straighten the vehicle after the turn is completed said dog actuating means engaging said dog coil returns the latter and said operating ring and switch to said central position, means for retaining said wire spring in position on said operating ring, and indexing means formed on said wire spring intermediate the ends thereof, and stationary means on said casing cooperating with said indexing means to resiliently retain said ring and switch in their different positions of adjustment.

16. In a direction signal mechanism, the combination of a switch having fixed and movable contacts, a switch operating ring, means operatively connecting said movable contact to said ring, a wire spring connected to said ring, and spaced coils on said spring forming dog means.

17. In a direction signal mechanism, the combination of a switch having fixed and movable contacts, a switch operating ring, means operatively connecting said movable contact to said ring, a wire spring connected to said ring, spaced coils on said spring forming dog means, detent means formed on said wire spring intermediate the ends thereof, and means cooperating with said detent means to hold said ring in different positions of adjustment.

18. In a device of the class described, the combination of a switch operating member, a wire spring mounted on said member, and spaced coil dogs formed on said spring.

19. In a device of the class described the combination of a switch operating member, a wire spring mounted on said member, spaced coil dogs formed on said spring, and detent means formed in said spring intermediate said coil dogs.

References Cited in the file of this patent

UNITED STATES PATENTS

| | | |
|---|---|---|
| 2,249,137 | Hill | July 15, 1941 |
| 2,276,411 | Moore | Mar. 17, 1942 |
| 2,284,936 | Wilshusen | June 2, 1942 |
| 2,427,595 | Fuller | Sept. 16, 1947 |
| 2,570,783 | Farley | Oct. 9, 1951 |
| 2,617,902 | Lincoln et al. | Nov. 11, 1952 |